July 12, 1927.
R. I. HENDERSON
FISHING TOOL
Filed Sept. 24, 1926
1,635,622
2 Sheets-Sheet 1
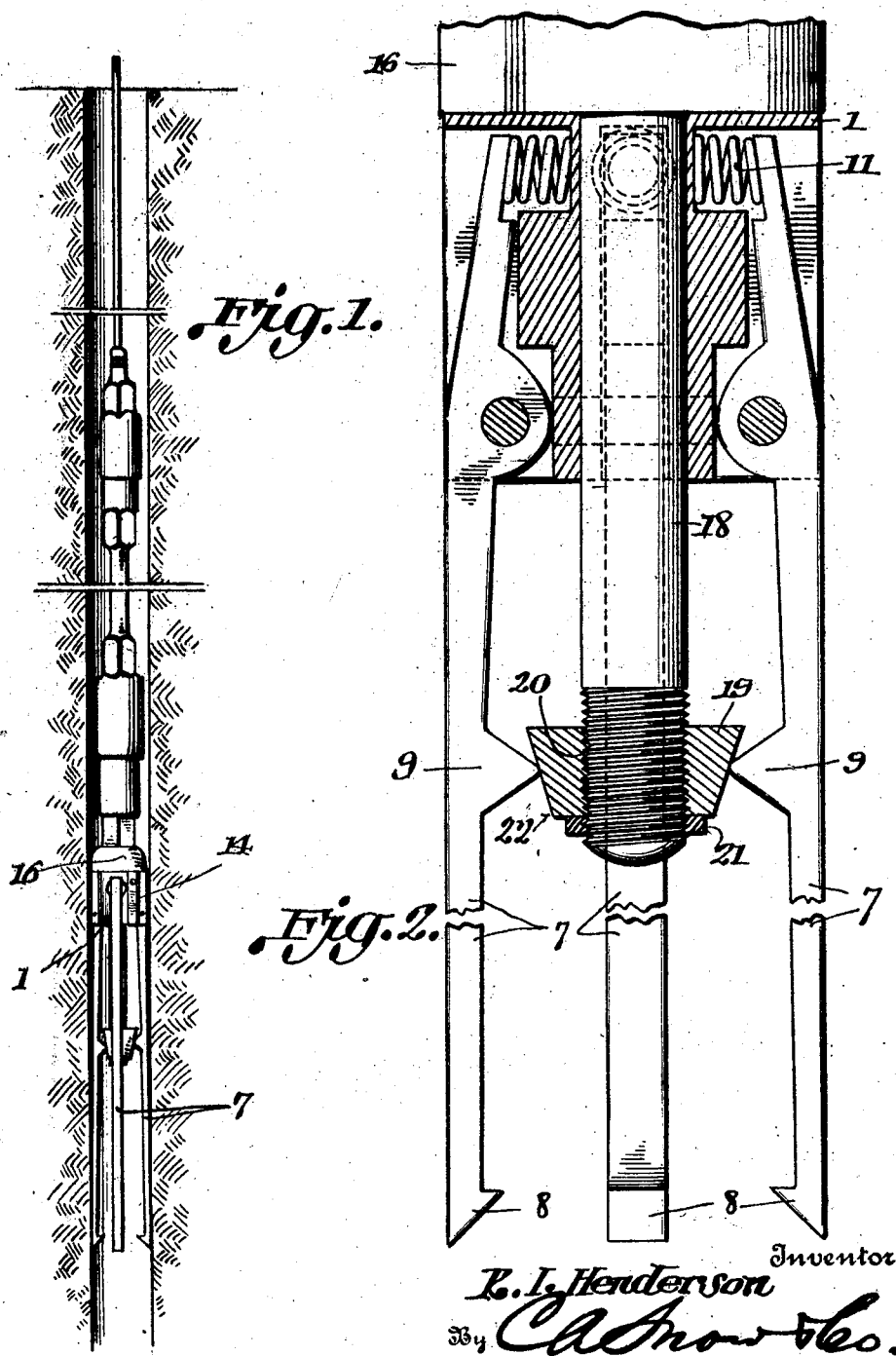

July 12, 1927.  R. I. HENDERSON  1,635,622
FISHING TOOL
Filed Sept. 24, 1926    2 Sheets-Sheet 2
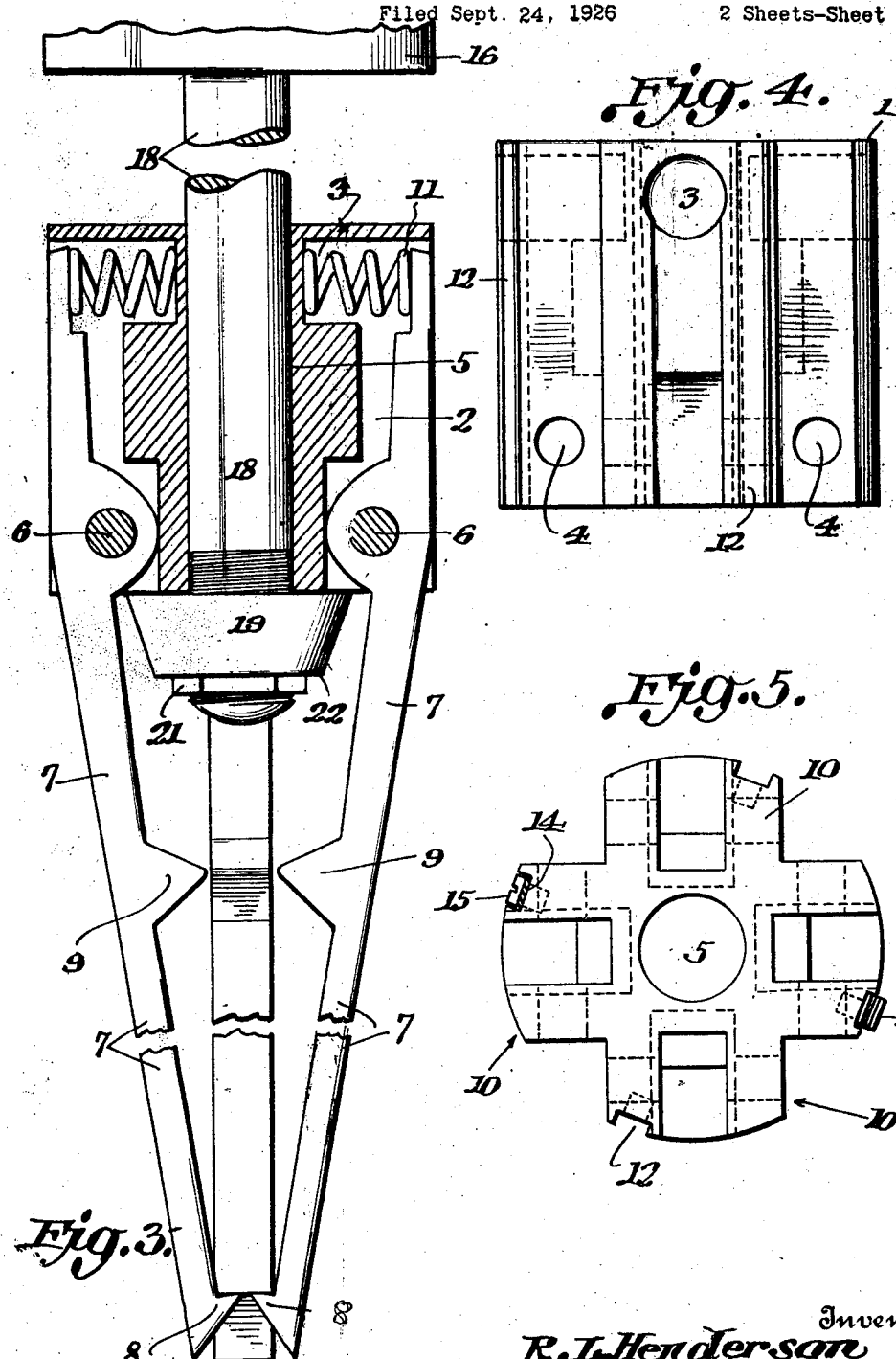

Patented July 12, 1927.

1,635,622

UNITED STATES PATENT OFFICE.

RALPH IRWIN HENDERSON, OF CHARLESTON, WEST VIRGINIA.

FISHING TOOL.

Application filed September 24, 1926. Serial No. 137,547.

This invention aims to provide a simple but effective means for fishing objects out of a well.

Figure 1 is a side elevation;

Figure 2 is a longitudinal section; parts being broken away and parts being in elevation, the grips being opened;

Figure 3 is a view similar to Figure 2 but showing the grips close together;

Figure 4 is a side elevation of the body;

Figure 5 is an end elevation of the body.

In carrying out the invention there is provided a body 1 which is cruciform in cross section, as shown in Figure 5, the body including arms 10 provided with longitudinal slots 2, there being deepened seats 3 at the upper ends of the slots 2. The arms 10 have transverse openings 4 and there is a central bore 5 in the body 1. The arms 10 have longitudinal grooves 12 located to one side of the slots 2, the grooves 12 being much shallower than the slots 2.

Pivot elements 6 are mounted in the openings 4 of the body 1. Grips 7, in the form of rigid levers, are mounted to swing on the pivot element 6, the upper ends of the grips 7 extending into the slots 2. Compression springs 11 are mounted in the seats 3 of the body 1, and engage the upper ends of the grips 7. The springs 11 tend to swing the lower ends of the grips 7 inwardly. The grips 7 are supplied at their lower ends with inwardly extended jaws 8. Intermediate its ends, each grip 7 has an inwardly extended projection 9, the upper and lower surfaces of which are inclined. Spring strips 14 are mounted in grooves 12 of the body 1 and are held therein by securing elements 15. The spring strips 14 tend to expand outwardly.

The numeral 16 marks a plunger which may be raised and lowered by any suitable means. The plunger 16 includes a stem 18 that is mounted to reciprocate in the central bore 5 of the body 1. A foot 19 is threaded for adjustment, as at 20, on the lower end of the stem 18 and is held in adjusted positions by a lock nut 21. The foot 19 tapers as shown at 22, and is of inverted frustoconical form.

In practical operation, the plunger is assembled with the body, as shown in the drawings, and the parts are lowered into the well. First, the spring strips 14 expand against the wall of the well or against the casing and limit the downward movement of the body 1. The plunger 16, however, moves downwardly, and the foot 19, cooperating with the projections 9 on the grips 7, expands or opens the grips, as shown in Figure 2, the body 1 and the plunger 16 then moving down together. When the device has been lowered until the jaws 8 are about the object to be removed, as shown in Figure 1, the plunger 16 is pulled upwardly, the spring strips 14 holding the body 1, at first, against participating in such upward movement. When the plunger 16 moves upwardly, independently of the body 1, the foot 19 is moved away from the projections 9 on the grips 7, and the grips are permitted to close together upon the object, under the action of the compression springs 11. The plunger 16 is raised until the foot 19 engages the lower part of the body 1, and then the plunger and the body move upwardly together, along with the object which is held by the jaws 8 and the grips 7. It will be understood that there may be as many of the grips 7 as is considered expedient.

Owing to the fact that the foot 19 is adjustable longitudinally of the stem 18 and is capable of being held in adjusted positions longitudinally of the stem by means of the lock nut 21, the amount that the grips 7 are sprawled apart by the foot 19, may be adjusted and regulated to suit the operator.

What is claimed is:—

1. In a device of the class described, a body, spring-closed grips carried by the body, a plunger slidable in the body and provided with mechanism for opening the grips when the plunger moves downwardly independently of the body, and means for retarding the movement of the body to permit the plunger to move for a time independently of the body.

2. A device of the class described, constructed as set forth in claim 1 and further characterized by the fact that said mechanism embodies a foot adjustable longitudinally of the plunger, and means for holding the foot in adjusted position longitudinally of the plunger.

In testimony that I claim the foregoing as my own, I have hereto affixed my signature.

RALPH IRWIN HENDERSON.